(12) United States Patent
Travis

(10) Patent No.: US 7,756,164 B2
(45) Date of Patent: Jul. 13, 2010

(54) DISTRIBUTING A TIMING REFERENCE OVER A COMMUNICATIONS BUS

(75) Inventor: Christopher Julian Travis, Wotton-under Edge (GB)

(73) Assignee: Wolfson Microelectronics plc, Edinburgh (GB)

( * ) Notice: Subject to any disclaimer, the term of this patent is extended or adjusted under 35 U.S.C. 154(b) by 544 days.

(21) Appl. No.: 11/798,904

(22) Filed: May 17, 2007

(65) Prior Publication Data

US 2008/0205453 A1   Aug. 28, 2008

(30) Foreign Application Priority Data

Feb. 28, 2007   (GB) ................... 0703916.7

(51) Int. Cl.
*H04J 3/06* (2006.01)
(52) U.S. Cl. ..................................... 370/503
(58) Field of Classification Search ......... 370/503–515; 375/354–376
See application file for complete search history.

(56) References Cited

U.S. PATENT DOCUMENTS

| | | | |
|---|---|---|---|
| 3,866,022 A | 2/1975 | Fletcher et al. | |
| 5,778,218 A | 7/1998 | Gulick | |
| 6,396,887 B1* | 5/2002 | Ware et al. | 375/354 |
| 2005/0030978 A1 | 2/2005 | Dropps et al. | |

OTHER PUBLICATIONS

Lee et al, Design of Clock Gears for Low-power Media Bus, ITC-CSCC, 4 pages, 2008.*
Philips Semiconductors, The I2C-bus specification, 46 pages, Jan. 2000.*
Boyce, Serial Low-power Inter-chip Media Bus (SLIMBusTM), National Semiconductor, 20 pages, unknown date.*

* cited by examiner

*Primary Examiner*—Frank Duong
(74) *Attorney, Agent, or Firm*—Dickstein Shapiro LLP

(57) ABSTRACT

On a communications bus, a relatively low frequency timing reference is distributed by regularly transmitting numbers that represent its instantaneous phase. An active framer component maintains a wrapping count of root superframes and, during each block, transmits in encoded form an expected value for the root superframe count at the start of the following block.

30 Claims, 5 Drawing Sheets

| F[3:0] | Root Frequency (MHz) | Phase Modulus (PM) |
|---|---|---|
| 0b1111 | Reserved | Reserved |
| 0b1110 | | |
| 0b1101 | | |
| 0b1100 | | |
| 0b1011 | | |
| 0b1010 | | |
| 0b1001 | 27 | 5625 |
| 0b1000 | 26 | 8125 |
| 0b0111 | 25 | 15625 |
| 0b0110 | 24 | 625 |
| 0b0101 | 19.2 | 125 |
| 0b0100 | 16.8 | 875 |
| 0b0011 | 15.36 | 100 |
| 0b0010 | 22.5792 | 147 |
| 0b0001 | 24.576 | 160 |
| 0b0000 | Not Indicated | defaults to 160 |

Figure 4

DISTRIBUTING A TIMING REFERENCE OVER A COMMUNICATIONS BUS

BACKGROUND OF THE INVENTION

1. Field of the Invention

This invention relates to the distribution of a timing reference over a communications bus, and in particular to the inclusion in the signals on the bus of a phase reference signal.

2. Description of the Related Art

In many bus-based communication systems, it is desirable to be able to transmit data at a high data rate. However, it is also desirable to be able to communicate a relatively low frequency system timing reference, so that particular processes in the connected components can be synchronized to each other. For example, a 25 Hz timing reference is of value in some systems because it can be used to synchronize circuitry operating at all of the common digital audio sample rates; 8 kHz, 11.025 kHz, 12 kHz and their important power-of-two multiples. The timing reference can also form the basis of time-of-day information, which is important when rendering time-stamped data.

It is known in other situations that it is desirable to impose a relatively low-frequency timing reference onto a high data rate signal. However, in such systems, the clock frequency and the frame rate are generally convenient multiples of the timing reference frequency. For example, some telecoms buses have a bus clock frequency of 19.2 MHz and a data frame rate of 8 kHz. Such buses can be used to distribute a 25 Hz timing reference by dedicating one bit per frame to carry a phase reference signal. The phase reference signal can be generated by, for example, transmitting a binary "1" in the first frame of each timing reference period, and transmitting a binary "0" in the 319 remaining frames of each timing reference period.

In other situations, the frame rate does not have such a straightforward relationship with the timing reference frequency. For example, in the case of the proposed SLIMbus™ system, defined by MIPI Alliance, Inc., the clock frequency and hence the frame rate can take on a lot of different values. Many of the possible frame rates are not integer multiples of e.g. 25 Hz. This makes it impossible to use a simple signalling scheme such as the one described above.

A known way of augmenting the simple signalling schemes is to include more-detailed information about the timing of each reference event. In particular, the information can indicate the temporal position of each reference event relative to the data frames. However, this approach inherits a problem from the simple schemes, which is that its update rate is no greater than the timing reference frequency. For example, with a 25 Hz timing reference it can take 40 ms for a process to become synchronized.

There is a need for a flexible, fast, efficient way of distributing a timing reference over a communications bus.

SUMMARY OF THE INVENTION

According to a first aspect of the present invention, there is provided a method of communicating a timing reference via a signal on a bus, the method comprising:

dividing a timeline into root superframes;

maintaining a root superframe count value; and during each data block, transmitting an encoded number representing the expected root superframe value at a specific point during one of said data blocks.

Thus, in embodiments of the present invention, a timing reference allows fast synchronization by regularly transmitting numbers that represent the instantaneous phase of the timing reference.

BRIEF DESCRIPTION OF THE DRAWINGS

For a better understanding of the present invention, and to show how it may be put into effect, reference will now be made, by way of example, to the accompanying drawings, in which:

FIG. 4 is a table showing parameter values according to an embodiment of the invention.

DETAILED DESCRIPTION OF THE PREFERRED EMBODIMENTS

Figure 1:
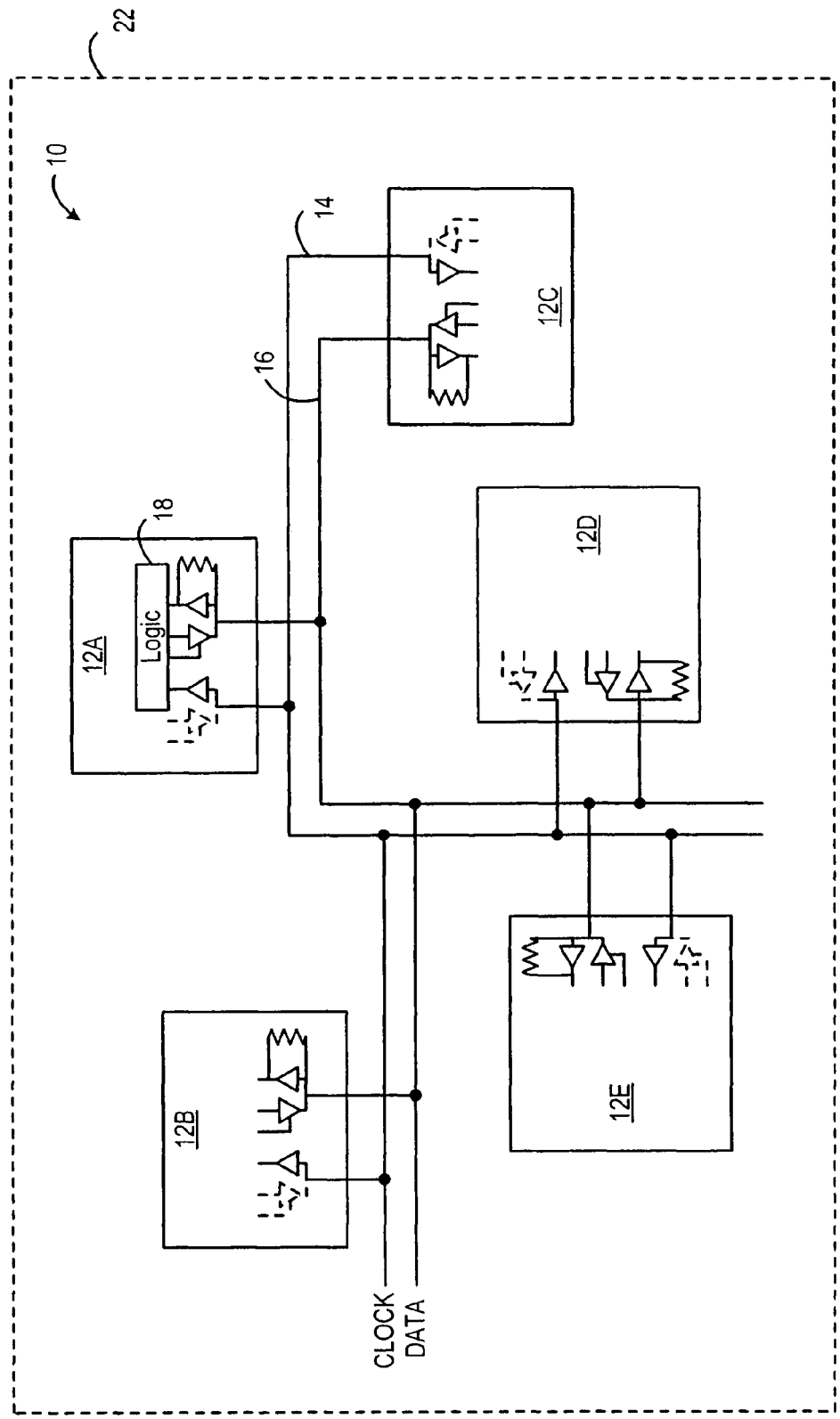
FIG. 1 is a block schematic diagram, illustrating a communications bus in accordance with the present invention.

FIG. 1 illustrates a bus-based communication system in accordance with the present invention. As shown in FIG. 1, the system 10 includes various components 12A, 12B, 12C, 12D and 12E, interconnected by a clock line 14 and a data line 16. As will be recognized, the communications bus will define techniques for determining which of the components has the right to transmit data at any time, and will also define the methods by which each component must write data to, and read data from, the data line of the bus. However, such details are not essential to an understanding of the present invention, and will not be described further herein.

For example, each of the components 12A, 12B, 12C, 12D and 12E may take the form of a separate integrated circuit in an electronic apparatus 22. For example, the electronic apparatus may be a mobile phone or a personal digital assistant (PDA), with audio and video processing functionality, and the various components may include speech coders, video processing ICs, audio processing ICs, etc.

In accordance with the present invention, at any one time, one of the components 12A, 12B, 12C, 12D and 12E is designated as the active framer, and hence as the source of a clock signal on the bus clock line 14 and, on the data line 16, of frame sync symbols and framing information.

Each of the components 12A, 12B, 12C, 12D and 12E contains appropriate logic 18, shown only in the component 12A, of a type which will be well known and understood by the person skilled in the art, suitable for generating and detecting the signals described herein.

Figure 3:
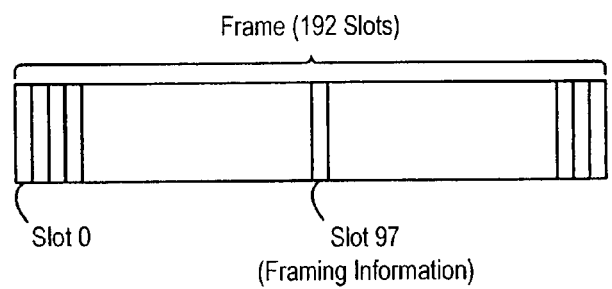
FIG. 3 illustrates the division of time frames into slots in an embodiment of the invention.

In the communications bus of the preferred embodiment, the frames are grouped into superframes, and the superframes are grouped into blocks. Each block consists of 10 superframes, and each superframe consists of 8 frames. Further, as shown in FIG. 3, each frame consists of 192 slots, and each slot can carry 4 bits of data. The first slot of every frame contains a frame sync symbol, and, as also shown in FIG. 3, the ninety-seventh slot of every frame is for the transmission of framing information by the active framer.

Figure 2:
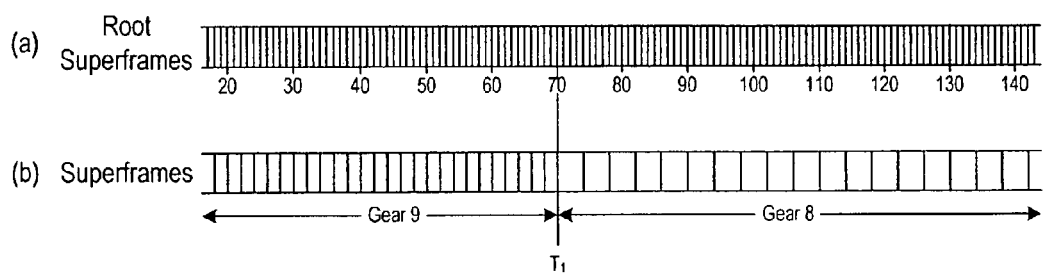
FIG. 2 illustrates a part of the timeline of the communications bus in one embodiment of the invention.

The clock frequency can be changed in power-of-two steps that are called clock gears. FIG. 2 illustrates this. In particular FIG. 2(b) shows the division of the timeline into superframes. Up to the time $T_1$, the system is in clock gear 9, with a particular clock frequency and a corresponding superframe rate. After the time $T_1$, the system is in clock gear 8, with a halved clock frequency and hence a halved superframe rate.

Changing the clock gear allows a high data rate to be achieved (by using a high gear) where required, but also allows the power consumption to be reduced (by using a low gear) where the bandwidth requirements are less.

Also in the preferred embodiment of the invention, a root frequency of the bus is defined. The root frequency is equal to the clock frequency in the highest gear, gear 10. In gear G, the clock frequency is $\frac{1}{2}^{(10-G)}$ of the root frequency.

The root frequency can be selected, based on the application for which the bus is being used. For example, if the bus is being used to transport digital audio signals with a sample rate of 48 kHz, it can be appropriate to use a root frequency of 24.576 MHz (as 24.576 MHz=512×48 kHz). In some mobile phones or PDA apparatus for example it might be more convenient to use 19.2 MHz or 26 MHz, and in optical disc (DVD) players or broadcast receivers that employ MPEG systems, a root frequency of 27 MHz could be advantageous.

Also in the preferred embodiment of the invention, the timeline of the communications bus is divided into root superframes. The fundamental feature of root superframes is that they are independent of the clock gear. FIG. 2(a) shows that the root superframes are unaffected by clock gear changes. In the highest gear, gear 10, the root superframes have the same frequency and phasing as the actual superframes on the bus. In gear 9, each actual superframe spans two root superframes, and this ratio increases in powers of two as you step down the gears, as can be seen in FIG. 2. In gear G, each actual superframe spans $2^{(10-G)}$ root superframes.

As mentioned above, it is desirable to transmit information that allows particular processes or circuits within the various components to reach and/or maintain synchronization with each other, within a short space of time. This phase reference signal can also be used by different applications as required. In the illustrated embodiment of the invention, a timing reference having a frequency equal to, or an integer fraction of, some base frequency (in this illustrated embodiment either 25 Hz or an integer fraction of 25 Hz) is embedded in the transmitted signal. It will be appreciated that, in other embodiments, the base frequency could take some value other than 25 Hz, such as 20 Hz, 50 Hz or 100 Hz.

In the illustrated embodiment of the invention, the phase reference signal operates by numbering the root superframes and, during each block, transmitting information relating to the expected number of the first root superframe in the next block.

The root superframes are numbered from #0 upwards, modulo a value referred to as the phase modulus (PM). The numbering is such that the start of every root superframe #0 is also the start of a cycle of the timing reference, at the base frequency or an integer fraction thereof. In order to achieve this, with a base frequency of 25 Hz, the root superframe rate (in Hz) divided by the phase modulus PM must be an integer fraction of 25, i.e. (25/N). As mentioned above, in this illustrated embodiment, each superframe consists of 8 frames and each frame consists of 192 slots, with each slot containing 4 bits of data, and so each superframe contains 8×192×4=6144 bits of data, and so the root superframe rate is $\frac{1}{6144}$ of the root frequency.

FIG. 4 is a table, showing various example root frequencies, chosen for compatibility with various applications that may use the communications bus according to the invention, and showing values of the phase modulus PM that are appropriate in each case. In some cases, for example where the root frequency is 22.5792 MHz and so the root superframe rate is 3.675 kHz, it is noted that the root superframe rate, i.e. 3.675 kHz in this case, is an integer multiple of 25 Hz (in fact 3.675 kHz=147×25 Hz), and so a value, i.e. 147 in this case, can be chosen for the phase modulus PM such that the superframe rate divided by the phase modulus PM=25, i.e. N=1.

In other cases, N is not equal to 1. For example, where the root frequency is 24 MHz, and hence the root superframe rate is 3.90625 kHz, it is noted that 3.90625 kHz is not an integer multiple of 25 Hz (in fact 3.90625 kHz=156.25×25 Hz), and so a value of 625 is chosen for the phase modulus PM (625=4×156.25) and the superframe rate divided by the phase modulus PM=6.25, i.e. N=4.

According to an aspect of the present invention, the framing information includes encoded information relating to the expected number of the first root superframe in the next block.

Figure 5:
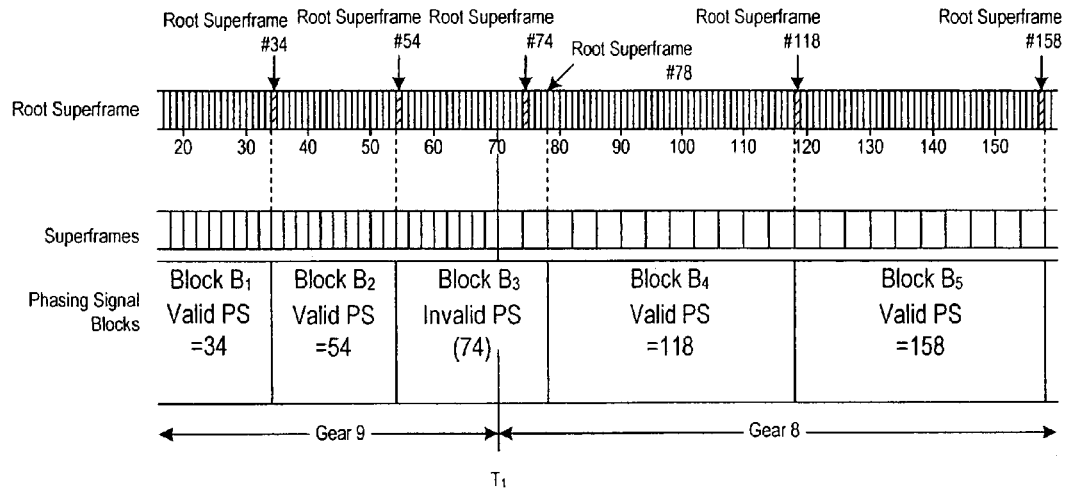
FIG. 5 illustrates a part of the timeline of the communications bus in one embodiment of the invention.

FIG. 5 illustrates the timeline in one illustrative embodiment of the invention, showing how this expected value, also referred to herein as a phase snapshot, is determined. Thus, FIG. 5 shows the timeline divided into root superframes, and shows the division of the timeline into actual superframes. FIG. 5 also shows the grouping of the superframes into blocks, with each block consisting of 10 superframes. Up to the time $T_1$, the system is in clock gear 9, with each actual superframe spanning two root superframes, and after the time $T_1$, the system is in clock gear 8, with each actual superframe spanning four root superframes.

Thus, while the system is in clock gear 9 there are two root superframes in each actual superframe, and therefore twenty root superframes in each block, and while the system is in clock gear 8 there are four root superframes in each actual superframe, and therefore forty root superframes in each block. FIG. 5 shows five blocks, namely block $B_1$, block $B_2$, block $B_3$, block $B_4$, and block $B_5$.

In each block, the active framer determines a value for the phase snapshot, PS, as $PS=(\text{PhaseOfCurrentBlock}+10*2^{(10-G)})\text{modulo } PM,$ where PhaseOfCurrentBlock is the number of the first root superframe in that block, G is the clock gear during that root superframe (although the clock gear can change at any superframe boundary), and PM is the phase modulus during that root superframe (although the root frequency and hence the phase modulus can change at any superframe boundary).

Thus, during block $B_1$, with the first root superframe in that block having been #14, and with the clock gear being 9, the phase snapshot=34. During block $B_2$, with the first root superframe in that block having been #34, and with the clock gear being 9, the phase snapshot=54.

During block $B_3$, with the first root superframe in that block having been #54, and with the clock gear being 9 at the start of the block, the phase snapshot=74. However, since the clock gear changes during the block, the next block actually starts at root superframe #78, and so the phase snapshot would be invalid.

During block $B_4$, with the first root superframe in that block having been #78, and with the clock gear being 8, the phase snapshot=118. During block $B_5$, with the first root superframe in that block having been #118, and with the clock gear being 8, the phase snapshot=158.

The calculated value for the phase snapshot is then encoded and transmitted in the framing information in the ninety-seventh slot of each frame.

Figure 6:
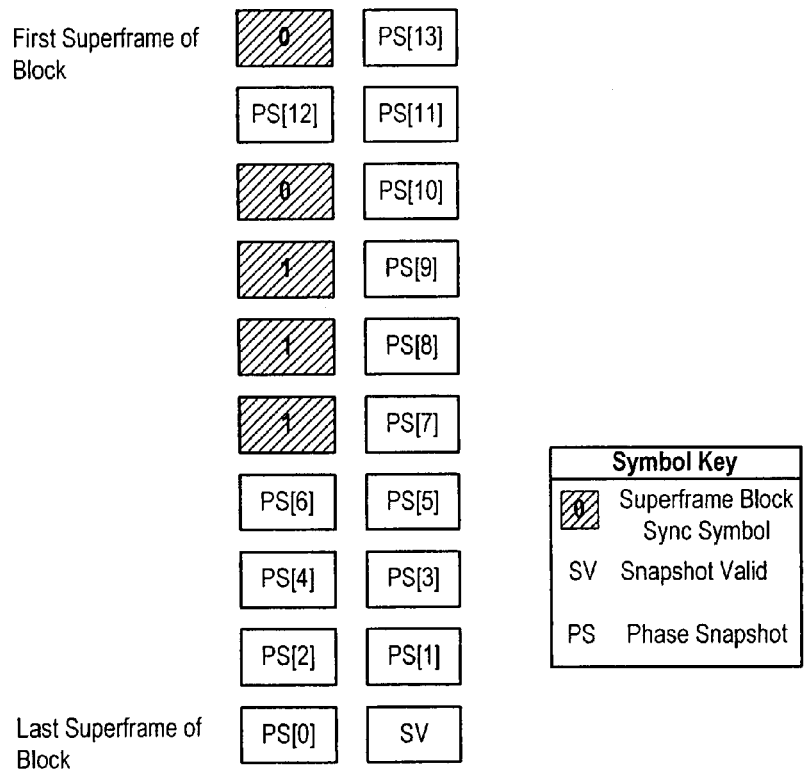
FIG. 6 illustrates the position of phase reference information in the superframes of a data block.

FIG. 6 illustrates the content of the phase reference signal across the superframes of a block. Thus, in each superframe, two bits are available for the transmission of the phasing signal, and these are denoted P0 and P1. Of these twenty bits per block, five (namely the P1 bit in the first, third, fourth, fifth and sixth superframes of each block) are available as a block sync signal, allowing the receiving component to determine the start point of each block. Also, one bit (namely the P0 bit in the last superframe of each block) is available as the snapshot valid flag. As discussed above with reference to block $B_3$, the transmitted phase snapshot will be invalid if the clock gear changes during the block. The snapshot valid flag, when low, indicates that the corresponding phase snapshot should be disregarded, e.g. because the clock gear has changed during the block.

The remaining fourteen bits are able to carry the phase snapshot value PS[13:0], as discussed above, that is, the number of the first root superframe in the following block, calculated on the assumption that there will be neither a root frequency change nor a clock gear change.

Figure 7:
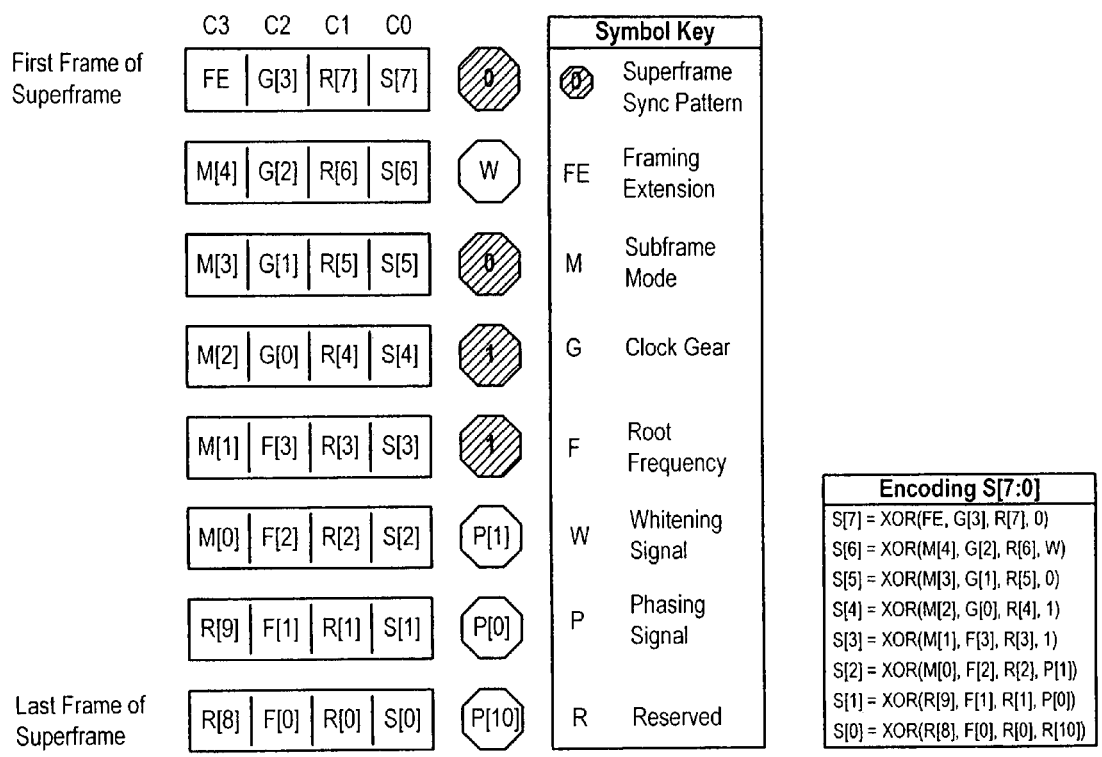
FIG. 7 illustrates the position of phase reference information in the frames of a superframe.

FIG. 7 illustrates the distribution of the framing information over multiple slots in the frames of a superframe. As shown in FIG. 7, and as discussed above, the framing information is transmitted in the four cells C[3:0] of the ninety-seventh slot in each frame, allowing thirty-two framing information bits per superframe. This framing information encodes various relevant parameter values, such as the clock gear value and the root frequency value. Of most relevance for an understanding of the present invention, however, the phasing signal is encoded in the C0 bits of the sixth and seventh frames of each superframe. Thus, there are two bits of framing information in each superframe.

Specifically, the C0 bit in the sixth frame of each superframe, i.e. S[2], is encoded as:

$$S[2]=XOR(M[0],F[2],R[2],P[1]),$$

while the C0 bit in the seventh frame of each superframe, i.e. S[1], is encoded as:

$$S[1]=XOR(R[9],F[1],R[1],P[0]),$$

where P[1] and P[0] in each superframe are determined as shown in FIG. 6 above.

Thus, a receiver can decode P[1] as the exclusive-OR of S[2], M[0], F[2] and R[2], and can decode P[2] as the exclusive-OR of S[1], R[9], F[1] and R[1].

The component that is the active framer therefore maintains an internal count of root superframes, wrapping to zero when the count reaches the phase modulus value, and encodes the expected root superframe number of the first root superframe in the next block, and transmits the encoded number in the current block.

Each other component also maintains its own internal count of root superframes. When acquiring synchronization, it detects the next valid phase snapshot value in the phasing signal, and then initializes its internal root superframe count to that phase snapshot value at the end of the corresponding block. Thereafter, it autonomously maintains its root superframe count, for example by incrementing the count value every $6144/2^{(10-G)}$ cells, and wrapping the count value whenever the count reaches the phase modulus value.

Thus, there is transmitted a count value, that allows each receiving component to determine which point has been reached in a relatively low frequency cycle. In the cases where N=1, as discussed above, this cycle has a frequency of 25 Hz; otherwise, this cycle has a frequency that is an integer fraction of 25 Hz. Thus, whenever the root superframe count reaches the phase modulus value and wraps to zero, there is a boundary in this low frequency cycle and, when N=1, the root superframe count reaches the phase modulus value and wraps to zero at each such boundary at a frequency of 25 Hz. However, where N>1, the root superframe count reaches the phase modulus value and wraps to zero at less than 25 Hz.

In a preferred embodiment, each component also checks its internal root superframe count against the subsequently received phase snapshot values. Isolated differences can be ignored, but the component can for example realign its root superframe count, by re-initializing it to the received phase snapshot value, if two consecutive detected received valid phase snapshot values do not match the internal root superframe count values.

Also, the root superframe count in all components is preferably reset to zero in the event of a root frequency change.

There is thus described a bus-based communication system, and components for use therewith, that allow the generation and use of a phase reference signal for communicating a relatively low frequency timing reference.

What is claimed is:

1. A method for communicating a timing reference via a signal on a bus, the method comprising:
   providing an integrated circuit, wherein the integrated circuit performs the steps of:
      providing an encoded number;
      dividing a timeline into root superframes;
      maintaining a root superframe count value; and
      during each data block, transmitting the encoded number representing the root superframe count value expected at a specific point during one of said data blocks.

2. A method as claimed in claim 1, wherein the one of said data blocks is the immediately subsequent data block.

3. A method as claimed in claim 2, wherein the specific point is the start of the immediately subsequent data block.

4. A method as claimed in claim 1, wherein each block contains a plurality of frames, and wherein the encoded number is transmitted in bits of a subset of the frames in each block.

5. A method as claimed in claim 4, further comprising transmitting a validity flag in at least one frame of the block, said flag indicating if said expected root superframe value is valid.

6. A method as claimed in claim 1, wherein each block is equivalent to one or more root superframe, depending on a current value of a clock gear.

7. A method as claimed in claim 1, wherein said root superframe count value is reset to zero when it reaches a phase modulus value.

8. A method as claimed in claim 7, wherein data can be transmitted on said bus at a clock frequency, wherein said clock frequency can be selected from a plurality of available clock frequencies, and wherein said phase modulus value is determined on the basis of said clock frequency.

9. A method as claimed in claim 8, wherein said phase modulus value is selected such that said root superframe count value is reset to zero at a timing reference frequency which is equal to, or an integer fraction of, a base frequency.

10. A method as claimed in claim 8, wherein said phase modulus value is selected for each of said available clock frequencies, such that said root superframe count value is reset to zero at a respective timing reference frequency which is equal to, or an integer fraction of, a base frequency.

11. A method as claimed in claim 1, wherein a frequency of said timing reference is less than 100 Hz.

12. A method as claimed in claim 11, wherein said frequency of said timing reference is 25 Hz, or an integer fraction thereof.

13. A method as claimed in claim 1, wherein said bus is a two-wire bus, comprising a data bus line and a clock bus line, and said timing reference is communicated on said data bus line.

14. A component, for use in a bus-based communication system, said component comprising:
 a divider to divide a timeline into root superframes;
 a counter for maintain a root superframe count value; and
 a transmitter to transmit, during each data block, an encoded number representing the root superframe value expected at a specific point during one of said data blocks.

15. A component as claimed in claim 14, wherein the one of said data blocks is the immediately subsequent data block.

16. A component as claimed in claim 15, wherein the specific point is the start of the immediately subsequent data block.

17. A component as claimed in claim 14, wherein each block contains a plurality of frames, and wherein the encoded number is transmitted in bits of a subset of the frames in each block.

18. A component as claimed in claim 17, wherein the component is further adapted to transmit a validity flag in at least one frame of the block, said flag indicating if said expected root superframe value is valid.

19. A component as claimed in claim 14, wherein each block is equivalent to one or more root superframe, depending on a current value of a clock gear.

20. A component as claimed in claim 14, wherein said root superframe count value is reset to zero when it reaches a phase modulus value.

21. A component as claimed in claim 14, wherein a frequency of said timing reference is less than 100 Hz.

22. A component as claimed in claim 21, wherein said frequency of said timing reference is 25 Hz, or an integer fraction thereof.

23. A component as claimed in claim 14, wherein said bus is a two-wire bus, comprising a data bus line and a clock bus line, and said component is adapted to communicate said timing reference on said data bus line.

24. A component as claimed in claim 14, wherein the component is an integrated circuit.

25. A component as claimed in claim 24, wherein the component is a data processing integrated circuit.

26. A component as claimed in claim 24, wherein the component is an audio processing integrated circuit.

27. A component as claimed in claim 24, wherein the component is a video processing integrated circuit.

28. An electronic apparatus, for use in a bus-based communication system, comprising at least one component as claimed in claim 14.

29. An apparatus as claimed in claim 28, wherein said apparatus is a mobile communications device.

30. An apparatus as claimed in claim 28, wherein said apparatus is a personal digital assistant (PDA) device.

* * * * *